United States Patent [19]
Matuda et al.

[11] 3,794,293
[45] Feb. 26, 1974

[54] PRESSURE CONTROL DEVICE FOR REMOTE CONTROL OF MARINE ENGINE

[75] Inventors: Tutomu Matuda, Akasi; Hiroo Inque, Amagasaki; Makoto Takagi, Kobe, all of Japan

[73] Assignee: The Nippon Air Brake Co., Ltd., Kobe, Japan

[22] Filed: Nov. 30, 1972

[21] Appl. No.: 310,689

[30] Foreign Application Priority Data
Dec. 14, 1971   Japan................................ 46-101334

[52] U.S. Cl.................. 251/130, 251/134, 74/626, 318/15
[51] Int. Cl............................................ F16k 31/05
[58] Field of Search...... 251/133, 131, 134; 74/626; 318/15, 626, 468

[56] References Cited
UNITED STATES PATENTS
2,300,576   11/1942   Klein.............................. 318/15 X
2,420,552   5/1947   Morrill............................ 74/626
2,515,498   7/1950   Craene et al................... 251/133 X
3,363,480   1/1968   Murphy.......................... 74/626

Primary Examiner—Arnold Rosenthal
Attorney, Agent, or Firm—Ralph W. McIntire, Jr.; W. F. Poore

[57] ABSTRACT

Throttle control apparatus for a marine engine employing an electric motor for automatically advancing the throttle at a slow, continuous rate in the navigation speed range of the engine. The apparatus further includes a planetary gear system via which the throttle control handle acts during starting speeds to advance the throttle manually. An electromagnetic clutch couples the motor to the output member of the planetary gear system when the throttle control handle is moved from the starting speed range into the navigation speed range. The planetary gear system is concurrently adjusted in accordance with the selected handle position so as to automatically terminate operation of the motor and consequently maintain the throttle setting in accordance with the selected handle position.

11 Claims, 5 Drawing Figures

PATENTED FEB 26 1974 3,794,293
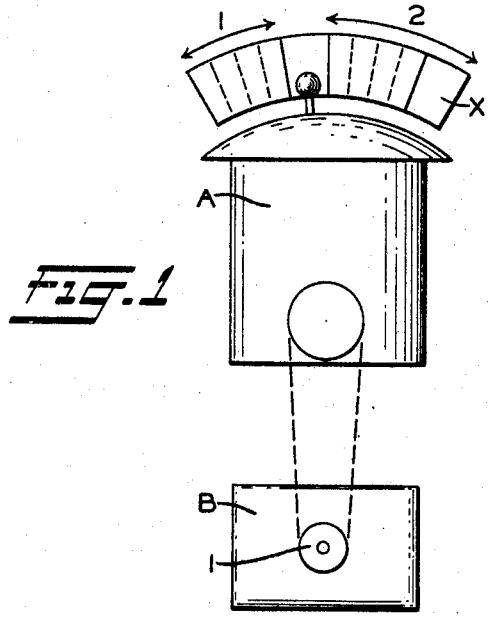
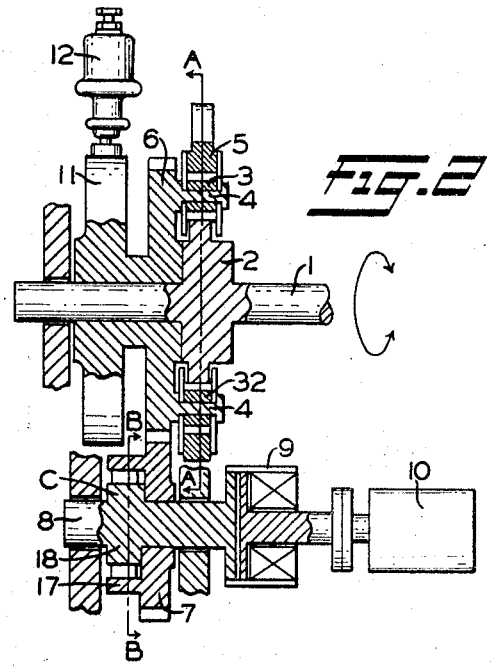
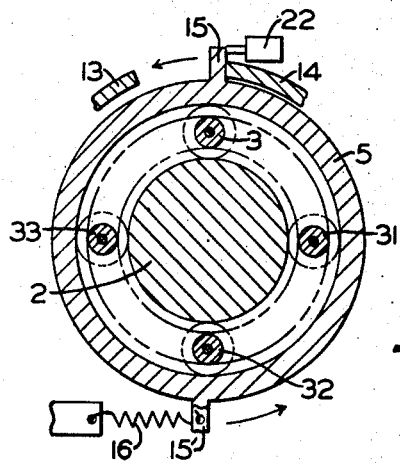
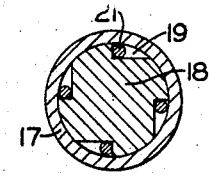
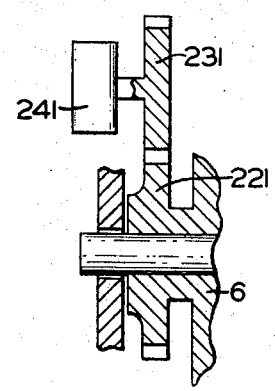

PRESSURE CONTROL DEVICE FOR REMOTE CONTROL OF MARINE ENGINE

BACKGROUND OF THE INVENTION

The present invention deals particularly with a semi-automatic throttle control mechanism to provide for the remote control of a marine engine. In order to prevent possible damage especially to large marine engines, the throttle must be gradually advanced in the higher speed range to avoid increasing the engine load too rapidly. In order to accomplish this, the operator is required to manually advance the throttle in very small increments over a long period of time until the desired speed is reached. This of course is a very tedious and time consuming operation, requiring the complete attention of the operator for an extended duration.

While some care is also required when operating in the lower speed ranges, the throttle control procedure is not so critical and the operator experiences relatively little difficulty controlling the engine speed during this initial phase of acceleration.

SUMMARY OF THE INVENTION

It is accordingly the object of the present invention to provide a simple, inexpensive remote speed control mechanism for marine engines which provides for the conversion from manual to automatic control of the engine throttle advance within a predetermined critical zone of the speed range.

It is a further object of the invention to provide for automatically terminating and maintaining the throttle advance position within the critical speed zone when the engine speed corresponds to a preset position of the control handle.

In accomplishing these objects, the invention utilizes a constant speed, auxiliary motor for slowly advancing the throttle in consequence of the control handle engaging a limit switch when it is manually advanced into a so-called navigation zone of the engine speed range. Prior to the control handle being advanced into this navigation zone, the control handle acts through a planetary gear system to drive a cam which in turn operates a control valve whose output establishes the degree of throttle control desired. When the limit switch is engaged, an electromagnetic clutch drive is energized to couple the auxiliary motor to the planetary gear system, the output member of which accordingly encounters the resistance of the initially stopped auxiliary motor to cause the gear system to actuate the heretofore stationary ring gear which normally holds the motor switch in its open position preventing operation of the auxiliary motor. The degree of movement of the control handle into the navigation zone, where it remains unattended, determines the distance the ring gear is moved away from the motor control switch. The auxiliary motor is thus effective to advance the throttle via the electromagnetic clutch and the output gear of the planetary gear system which is concurrently effective to rotate the ring gear back toward the motor control switch to terminate the automatic throttle advance by the auxiliary motor when the speed indicated by the present handle position in the navigation zone is reached.

Other objects and advantages of the invention will become apparent from the following more detailed description and operation of the invention when considered in accordance with the drawings of which:

FIG. 1 shows a control console for a marine vessel;

FIG. 2 shows a vertical section view of the speed control mechanism of the invention;

FIG. 3 shows a vertical section view taken along the cutting plane A—A of FIG. 2;

FIG. 4 shows a vertical section view taken along the cutting plane B—B of FIG. 2; and FIG. 5 shows a partial vertical section view of an alternate arrangement of the output mechanism comprising the invention.

DESCRIPTION AND OPERATION

Reference letter A in FIG. 1 represents a control stand from which a marine engine is operated for driving a vessel in the astern and ahead directions when the control handle is operated in zones 1 and 2, respectively, of a calibracted speed console associated with control stand A. Reference letter B represents the output mechanism of the invention for controlling the engine throttle and includes a shaft 1 which is interconnected, as for example by a chain drive, to the control handle shaft of control stand A.

In FIG. 2 is shown the output mechanism B in the form of a planetary gear system of which shaft 1 is a part. Fixed on shaft 1 is a sun gear 2 about which are disposed a plurality of planet gears 3, 31, 32 and 33. Each planet gear is rotatably carried on respective axles 4 projecting from the face of an output gear 6 that is free to turn on shaft 1. Fixed for rotation with gear 6 is a cam 11 through which a pneumatic control valve 12 is operated to control the throttle setting. Coaxial with sun gear 2 is a ring gear 5 having internal teeth which engage the teeth of planet gears 3, 31, 32, and 33. As best seen in FIG. 3, two projecting lugs 15 and 15' are formed on the outer surface of ring gear 5. Lug 15' is subject to a continuous force provided by a spring 16 which urges gear 5 in a clockwise direction. Lug 15 normally engages a stop member 14 under the force of spring 16 to limit the clockwise rotation of gear 5, in which limit position a switch 22 is engaged to normally maintain the switch contacts in an open condition.

Arcuately adjacent stop 14 is formed another stop 13 adapted to limit the counterclockwise rotation of gear 5, in which limit position the throttle is operated to produce maximum engine speed. The distance between stops 13 and 14 corresponds to engine speeds defined by the so-called navigation speed zone at the upper extreme of the ahead speed range, as indicated by segment X of the control stand speed console.

Switch 22 serves to control operation of a small electric motor 10 whose output shaft is coupled to a shaft 8 via an electromagnet clutch device 9. A limit switch (not shown) associated with the speed console of control stand A is engaged by the control handle when the handle enters the navigation zone X of the engine speed range to thereby energize clutch 9 and accordingly establish a torque link connection between motor 10 and shaft 8 any time the control handle is in the navigation zone. Shaft 8 is connected via a slip clutch C to gear 6, which is accordingly driven by motor 10 in one direction of rotation thereof, as hereinafter explained.

FIG. 4 shows slip clutch 10 comprising a cog wheel 18 formed on shaft 8 and a cylindrical member 17 in close fitting relationship with the periphery of cog wheel 18 so as to form wedge-like openings therebetween, in which are disposed rollers 21. Cylindrical member 17 is formed with gear teeth 7 for engagement with gear 6 and is supported so as to rotate freely on shaft 8. When cylindrical member 17 rotates in a counterclockwise direction, as viewed in FIG. 4, rollers 21 are forced toward the wide portion of spaces 19 to permit member 17 to turn free relative to member 18; and conversely, relative motion between members 17 and 18 in the opposite direction forces rollers 21 toward the narrow portion of spaces 19 where a wedging action occurs to impart a friction drive between shaft 8 and gear 7.

In order to accelerate the engine when operating in the ahead direction, the handle of control stand A is gradually shifted toward zone 2 of the control console, for example from the stop position the handle is shown to occupy in the drawing. This results in a rotary force being imparted to shaft 1 and consequently to gear 2 in a clockwise direction, as viewed in FIG. 3. In that electromagnetic clutch 9 is disengaged until the control handle is shifted into the navigation zone X, gear 6 is free to rotate on axle 1. Due to the bias force imparted to ring gear 5 by spring 16 in the direction of stop 14, switch 22 is prevented from energizing motor 10 and sufficient resistance is offered to rotation of ring gear 5 in the counterclockwise direction, whereby continued movement of the control handle sets up counterclockwise rotation of the individual planet gears about their axles 4 which are concurrently forced to revolve around the axis of sun gear 2 in a clockwise direction. This results in gear 6 and consequently cam 11 being driven by the planetary gear system to gradually actuate control valve 12, thereby increasing the engine throttle in proportion to the degree of movement of the control handle.

When the control handle is shifted into the navigation zone X of the ahead speed control range, a limit switch is engaged to energize electromagnetic clutch 9 and accordingly connect the shaft of motor 10 to gear 6 via shaft 8, cog wheel 18 and gear 17 comprising slip clutch C. In that gear 7 had been turning clockwise, as viewed in FIG. 4, due to engagement with gear 6, slip clutch is effective to establish corresponding rotation of shaft 8 so that when clutch 9 becomes engaged, gear 6 will accordingly experience increased resistance to rotation due to motor 10, with which it is now connected, being inoperative. The resistance offered by motor 10 and effective at gear 6 is greater than the bias of spring 16 on on ring gear 5 so that continued movement of the control handle into the navigation zone X results in planetary gears 3, 31, 32 and 33 rotating clockwise about their axles 4 without corresponding movement of gear 6 and axles 4. The planet gears are accordingly effective to impart rotation to ring gear 5 in a counterclockwise direction away from stop 14 an amount corresponding to the degree of control handle movement into the navigation zone X, concurrently allowing switch 32 to close its contacts and energize motor 10. With the control handle positioned in the navigation zone according to the desired speed at which it is desired to operate the vessel, the operator may now leave the handle unattended and motor 10 acting through electromagnetic clutch 9 and slip clutch C will drive gear 6 and camm 11 independent of the planetary gear system.

The operating speed of motor 10 is selected in accordance with the gear ratio between gears 6 and 7 a slow continuous rotation of cam 11 whereby the throttle control is automatically advanced in the navigation zone at a controlled rate, without requiring the attention of the operator during this time. In that the control handle is set in a preselected position corresponding to the desired engine speed, axle 1 and accordingly sun gear 2 remain stationary, while the motor driven gear 6 causes the planet gears 3, 31, 32 and 33 to revolve around the sun gear in a clockwise direction. This in turn causes the ring gear 5 to be rotated in a clockwise direction until lug 15 engages stop 14, at which point switch 22 is engaged to deenergize motor 10. Therefore, motor 10 is effective to advance the engine throttle until the speed selected by the position of the control handle in the navigation zone is realized. This speed corresponds to the distance lug 15 is initially moved away from stop 14 and the motor operation is terminated when lug 15 of ring gear 5 rotates through this distance back toward stop 14. Cam 11 is accordingly positioned to operate control valve 12 and maintain the established throttle setting as long as the control handle remains in the position selected.

If it is desired to decelerate the engine, the control handle is manually shifted at a normal speed back toward a neutral position, thus imparting rotation of shaft 1 and sun gear 2 in a counterclockwise direction. This in turn imparts a clockwise force on ring gear 5 via planet gears 3, 31, 32 and 33, the axles 4 of which are caused to revolve in a counterclockwise direction about the axis of sun gear 2 due to ring gear 5 being prevented from rotating in the direction of the applied force due to engagement of lug 15 with stop 14. Accordingly, gear 6 and cam 11 are rotated in a counterclockwise direction, as viewed in FIG. 3 to reduce the output of control valve 5 so that the engine throttle is correspondingly reduced with movement of the control handle toward neutral. It should be recognized of course that slip clutch C is in a free running condition due to the applied force from gear 6 being in the direction of reduced throttle, since electromagnetic clutch 9 remains engaged until the control handle is moved out of the navigation zone X.

It it is desired to move the control handle out of the navigation zone before the engine speed corresponding to the preselected handle position is realized, lug 15 of ring gear 5 will still be between stops 13 and 14 so that movement of the control handle will result in planet gears 3, 31, 32 and 33 initially rotating the ring gear in a clockwise direction until lug 15 engages stop 14 and concurrently terminates operation of motor 10. Subsequent handle movement in the decreasing throttle direction will thence result in gear 6 and cam 11 being rotated, as above explained, to reduce the throttle.

It will now be apparent that the heretofore tedious and time consuming procedure of controlling the throttle in the navigation zone is eliminated without imposing a heavy burden on the engine, whereby the engine is able to operate relatively trouble-free over an extended service period.

It is also to be understood that an alternate output control device may be employed in place of pneumatic control valve 12, for example a potentiometer or other type rheostat. As shown in FIG. 5 gears 221 and 231 are installed in place of cam 11 to control a potentiometer or rheostat 241, with the resultant electrical output signal being utilized to control the throttle in a well known fashion.

Having now described the invention what we claim as new and desire to secure by Letters Patent, is:

1. Throttle control apparatus for a marine engine operated by manipulation of a control handle in first and second speed regions of said engine, comprising:
   a. control means for establishing different throttle settings depending upon the position of said handle;
   b. drive means for operating said control means, said drive means being operative in response to movement of said handle in said first region of said speed range; and
   c. motor means cooperating with said drive means when said handle is in said second speed region for automatically changing the setting of said throttle in accordance with the speed of said motor, said drive means being adjusted in accordance with the selected position of said handle in said second speed region to automatically terminate operation of said motor when said throttle setting corresponds to the selected handle position.

2. Apparatus as recited in claim 1, further characterized in that said drive means comprises a planetary gear system including:
   a. an input shaft rotatable in response to movement of said handle;
   b. a sun gear fixed on said input shaft for rotation therewith;
   c. a ring gear concentric with said sun gear;
   d. a plurality of planet gears interposed between said sun gear and said ring gear for operation therebetween, each of said planet gears having an axle; and
   e. an output gear from which said axles project, said output gear being carried on said input shaft for free rotation thereon so as to effect operation of said control means.

3. Apparatus as recited in claim 2, further comprising:
   a. said ring gear having a lug extending between first and second arcuately spaced stop members for engagement with one or the other thereof; and
   b. bias means for urging said ring gear in a direction to engage said lug with one of said stop members whereby movement of said handle in said first speed region causes said planet gears to revolve about said sun gear in one direction so that said output gear is accordingly rotated with said revolving planet gears.

4. Apparatus as recited in claim 3, further comprising:
   a. motor controlling switch means engageable with said lug when said lug is engaged with said one stop member;
   b. coupling means between the output shaft of said motor and said output gear; and
   c. means for engaging said coupling means when said handle is shifted from said first speed region to said second speed region whereby the resistance offered by said motor is transmitted to said output gear, said resistance being greater than the force of said bias means whereby said ring gear is driven in a direction to move said lug toward the other one of said stop members in accordance with movement of said handle in said second speed region, thereby disengaging said lug from said switch means to effect operation of said motor.

5. Apparatus as recited in claim 4, further characterized in that operation of said motor is transmitted via said output gear to cause said planet gears to revolve around said sun gear in said one direction for driving said ring gear so that said lug is moved back toward said one stop member to automatically terminate operation of said motor when the throttle setting corresponds to the selected position of said handle in said second speed region.

6. Apparatus as recited in claim 4, further comprising slip clutch means intermediate said coupling means and said output gear for interrupting the drive connection between said motor and said output gear to permit said planet gears to revolve about said sun gear in a direction opposite said one direction in response to said handle being moved from said second speed region toward said first speed region.

7. Apparatus as recited in claim 1, further characterized in that the speed of said motor is constant, being at a very slow rate to prevent overloading said motor when accelerating in said second speed region.

8. Apparatus as recited in claim 3, further characterized in that the arcuate distance between said first and second stops corresponds to the degree of throttle variation capable of being obtained by operation of said control handle in said second speed region.

9. Apparatus as recited in claim 1, further characterized in that said control means comprises a pneumatic control valve device providing output fluid pressure for the control of said throttle setting.

10. Apparatus as recited in claim 1, further characterized in that said control means comprises an electrical rheostat for varying the resistance in an electrical circuit controlling said throttle setting.

11. Apparatus as recited in claim 4, further characterized in that said coupling means is an electromagnetic clutch.

* * * * *